C. NAGEL.
SACK SCALE.
APPLICATION FILED MAR. 7, 1912.
1,045,062.
Patented Nov. 19, 1912.
2 SHEETS—SHEET 1.
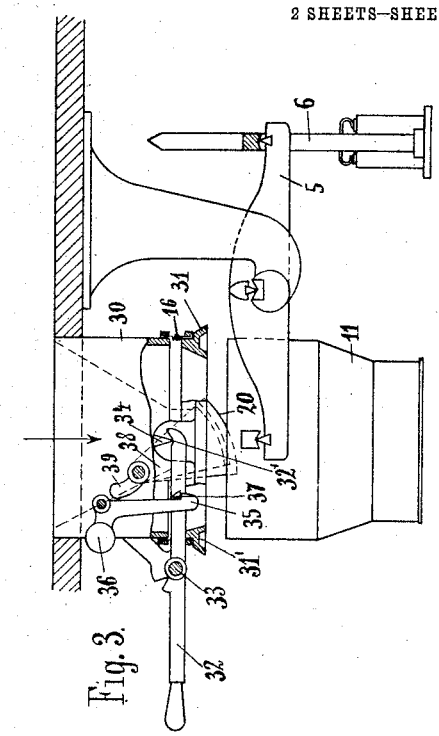
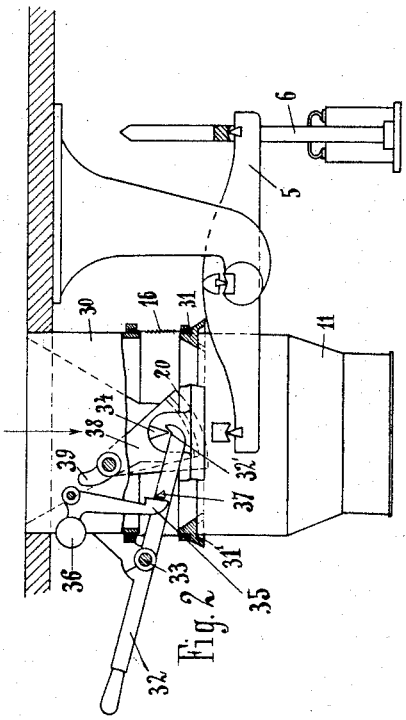
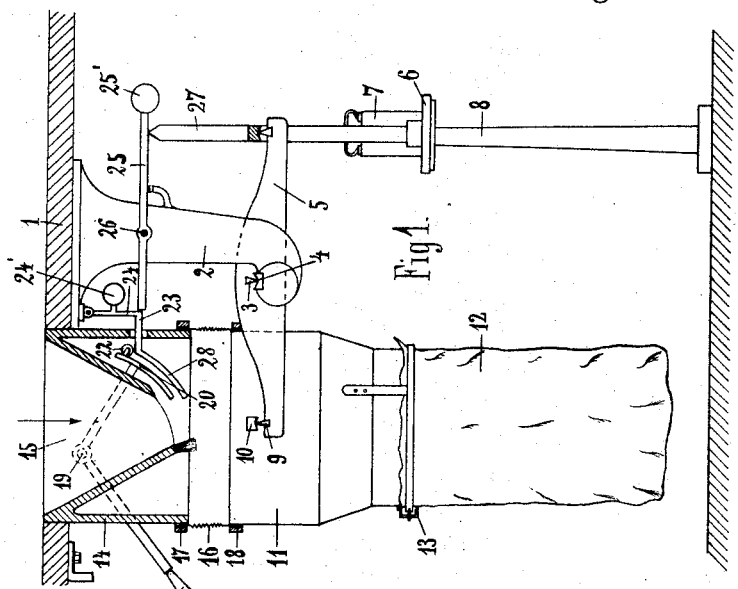
Witnesses:
Inventor
Carl Nagel
by
Atty C. NAGEL.
SACK SCALE.
APPLICATION FILED MAR. 7, 1912.
1,045,062.
Patented Nov. 19, 1912.
2 SHEETS—SHEET 2.
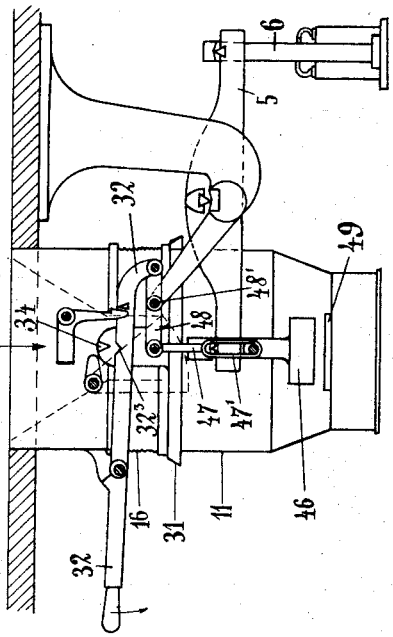
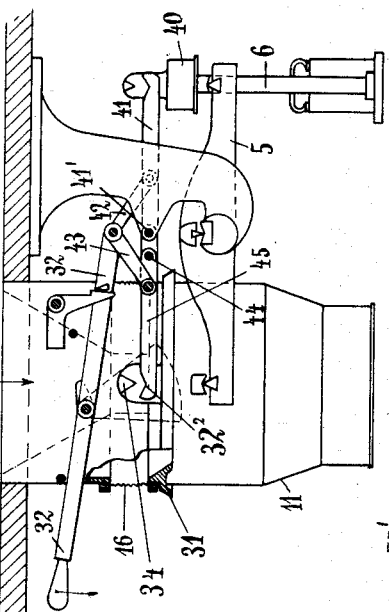
Witnesses:
Inventor
Carl Nagel
by

UNITED STATES PATENT OFFICE.

CARL NAGEL, OF GLIESMARODE, GERMANY.

SACK-SCALE.

1,045,062.  Specification of Letters Patent.  Patented Nov. 19, 1912.

Application filed March 7, 1912. Serial No. 682,106.

*To all whom it may concern:*

Be it known that I, CARL NAGEL, owner of a manufactory, a subject of the Duchy of Brunswick, Empire of Germany, residing at Gliesmarode, Dukedom of Brunswick, Germany, have invented certain new and useful Improvements in Sack-Scales, of which the following is a specification.

My invention relates to improvements in sack scales, such as are used for weighing powdered materials, such as flour, gypsum, ground hydraulic cement, and the like, and more particularly in scales of that class in which a weighing beam supports at one end a scale for the weights and at the opposite end a collar which is adapted to have the sack attached thereto and to hold the same in open position, and is connected by means, such as a tube or hose of fabric, with a funnel suspended from the ceiling of the building or from a suitable frame work, and serves to convey the material to be weighed into the sack.

One of the objects of the improvements is to construct the connecting member in such a way, that it does not interfere with the free movement of the scales while the latter are being controlled.

Furthermore my invention consists in providing means for locking the tubular stud or collar carrying the sack, which permits the sack to be shaken, as is necessary for completely and densely filling the same, without at the same time moving the collar, which would injure the knife edge bearing of the collar on the weighing beam. With this and other objects in view my invention consists in the matters described hereinafter and particularly pointed out in the appended claims, reference being had to the accompanying drawings and the letters of reference marked thereon, which form a part of this specification.

For the purpose of explaining the invention several examples embodying the same have been shown in the accompanying drawings, in which the same letters of reference have been used in all the views to indicate corresponding parts.

In said drawings—Figure 1, is a side view partly in section of scales of known construction which have been shown in order that the application of my invention be more clearly understood, Figs. 2 and 3, are side views of sack scales embodying one part of my invention, Fig. 2 showing the parts in the position in which the connecting tube is seated on the collar carrying the sack, and Fig. 3 showing the same in the removed position, Figs. 4 and 5, are side views similar to those shown in Figs. 2 and 3 and each showing a modification of the invention, the parts being shown in the positions corresponding to those shown in Figs. 2 and 3, Figs. 6 and 7, are similar side views of the scales showing locking means for the collar which for the matter of clearness have not been shown in Figs. 2 to 5.

Before describing those parts to which my invention more particularly relates I shall describe an example of sack scales in which my invention is preferably embodied. But I wish it to be understood, that my invention is not limited in its application to the particular scales shown in the drawings.

Referring to Fig. 1 a pair of brackets or hangers 2 are suspended from the ceiling 1 of the building or from a suitable frame work, and on the said brackets or hangers a pair of scale beams 5 are mounted by means of knife edge bearings consisting of seats 4 secured to the hangers and a pair of knife edges 3. In the figure only one of the hangers, scale beams, seats and edges are shown. At their right hand ends the scale beams carry a weight pan 6 which is adapted to hold the weight or weights 7 and to rest in the usual way on a pillar 8 or similar support. At the left hand end of the scale beams a collar 11 is mounted by means of knife edge bearings consisting of seats 10 and knife edges 9. To the said collar the sack to be filled can be attached by means of buckles 13 or the like. The material to be weighed is supplied to the sack through a funnel 14 which a suitable distance above the collar 11 is suspended from a frame work or, as shown, from the ceiling 1 of the building. The inlet end to the funnel is located below a hole 15 made in the ceiling through which the material is continuously supplied by any known or preferred means, such for example as elevators, or where the material is stored within the room above the ceiling, the material is supplied to the said aperture 15 without any machinery. Between the collar 11 and the funnel 14 a tube or hose 16 of fabric is interposed which is connected at its upper end with the funnel and at its lower end with the collar. Suitable connecting means are provided to connect the tube 16 to the funnel and collar which in the example shown consist of clamping rings 17 and 18. The object of the tube 16 is to prevent the dust from the material being fed from escaping into the room where the scales are located. Below the funnel 14 a valve or plate 20 is located which is adapted to rock about an axis 19 and to close the funnel, when the desired amount of material has been filled into the sack. The axis 19 is provided with a handle 21 by means of which the valve can be moved into opening position shown in the figure, and the valve is provided with a suitable stop, such as a roller 22, which in the open position of the valve is engaged by a shoulder 23 formed on a rocking lever 24, the latter being adapted to be rocked by a weight 24' or its equivalent into locking position relatively to the roller 22. When the lever 24 is thus moved into locking position it is itself locked by means of a rocking arm 25 which is pivotally mounted at 26 and carries a weight 25' or the like. This arm is adapted to engage with its left hand end the rear face of the lever 24, as is shown in the figure. In this position of the parts the roller 22 is unable to force the lever 24 backward, so that the valve 20 can not drop by gravity into closing position. When the sack has been filled and is moving downward, a push rod 27 connected with the scale 6 engages the arm 25 from below so as to lift the same. Thereby the valve 20 is unlocked, so that it is rocked downward by gravity and closes the funnel 14. The lower end of the lever 24 is curved as at 28, and on this curved portion the roller 22 bears also in the closing position of the valve, so that the lever 24 and the arm 25 can not be rocked backward, before the valve 20 has again been completely moved into opening position. After the filled sack has been disconnected from the collar 11 and an empty sack secured in its place, the handle 21 is pulled downward, whereupon a new filling operation begins. Sack scales of the class described are objectionable in this respect, that the tube 16 of fabric interferes with controlling the scales, which is necessary every now and then to assure accurate measurements. Besides it is preferable to arrange all the subsidiary means connected with the scales in such a way, that the scales can be tested when being loaded as well as when not being loaded. Furthermore the scales are objectionable, because when shaking the sacks or throwing the same against adjacent walls, as is frequently necessary for densely filling the same, the knife blade bearings of the collar are subject to injury, because the said collar is vehemently oscillated. For this reason my invention consists in providing means of the character illustrated in Figs. 2 to 7 of the drawings.

Referring more particularly to the example shown in Figs. 2 and 3, the scales correspond in their general construction to those shown in Fig. 1. The tube or hose 16 of fabric is secured with its upper end to a tube 30 inclosing the funnel. With its lower end it is not secured to the collar 11, but to a ring 31 which fits snugly but detachably on the upper margin of the collar and is equipped with lifting means by means of which it can readily be removed from or put on the collar. At its bottom end the said ring is preferably provided with an annular groove 31' preferably of conical shape, to assist in putting the ring in position on the collar by guiding the same on the margin of the latter to its proper place. This tightening member can readily be removed from the scales prior to testing the same, as is shown in Fig. 3, and it can also readily be applied to the ring. In the example shown in Figs. 2 and 3 the lifting means consist of a hand lever 32 which is adapted to be rocked within a vertical plane about a pivot 33 secured to the funnel 14, and which is formed with a notch 32'. When forcing the said hand lever downward into the position shown in Fig. 3, its notch 32' engages a knife edge 34 secured to the ring 31 above the center of gravitation thereof, so that when further depressing the lever 32 the ring 31 is lifted from the collar 11. When in its upper position the ring 31 may be held by a hook 35 which as shown is pivotally mounted on the funnel 30 and is held in position for engagement with a nose 37 of the lever 32 by a weight 36. By lifting the weight 36 the lever 32 is again released, whereupon the ring 31 can again be placed on the collar 11. This may be done by means of a cam 39 provided on an arm 38 of the valve 20, which cam unlocks the hook 35 and permits the ring to drop downward, when the valve 20 is opened. In the weighing operation the ring 31 bears on the collar 11 suspended from the scale beam. Therefore in order that the weight of the material filled into the sacks may be correct, the weight of the ring 31 must be balanced on the scale beam. This can be done by providing a poise on the side of the load of the scales which corresponds to the weight of the ring and bears on the scale beam when the ring is removed, or by removing a similar poise from the side of the weights. In Figs. 4 and 5 I have shown two examples in which the said subsidiary poise is automatically applied to or removed from the scale beam.

In the example shown in Fig. 4 a subsidiary poise 40 is placed on the weight pan 6, which is arranged to be lifted from said weight pan by the lever 32 by means of which the ring 31 is lifted from the collar 11. For this purpose the lever 32 is connected by a link 42 with a rocking lever 41 adapted to take hold of the subsidiary poise 40, and by a second link 43 with an arm 45 which is pivotally mounted on a stud 41' or on a stud 44 of its own. The arm 45 is formed with a notch 32² located in position for engagement with the knife edge 34 provided on the ring 31. By depressing the lever 32, the arm 45 and lever 41 are simultaneously rocked upward, so that the ring 31 and the subsidiary poise 40 are lifted.

In the example shown in Fig. 5 the subsidiary weight 46 is located at the side of the scale beam which carries the load, and it is placed on the scale beam when the ring is being removed from the collar 11. By means of a rod 47 it is suspended from a rocking lever 48 the fulcrum 48' of which is located at a point intermediate its ends, and which is jointed to the lever 32. When the lever 32 is forced downward, it engages the knife edge 34 with its notch 32³ and lifts the ring 31 from the collar 11, and simultaneously it places the weight 46 on a plate 49 connected with the collar, so that also in this case the scale beam is in equilibrium after lifting the ring 31. The weight 46 is suspended from the lever 47 by means of an elongated ring 47', so that there is a certain play between the rod 47 and the weight 46, which in testing permits the scale beam to oscillate, after the ring 31 has been lifted.

Instead of the tube 16 a membrane may be used in all the cases described above.

The part of my invention which has been shown in Figs. 6 and 7 is preferably used in connection with the parts described with reference to Figs. 2 to 5. But I wish it to be understood, that both features of the invention may also separately be used, and that under circumstances one of the features may be omitted. In order not to render the drawing too complicated, I have shown the parts in separate views. In Figs. 6 and 7 I have shown means for locking the collar 11 in position, while the sack is being shaken. Such locking means as now constructed are frequently provided with catches, whereby they are held in elevated position, so that the attendant can release the locking means and shake the sack with both his hands. My invention particularly relates to an apparatus of this class, and it consists in providing means for disengaging the locking means from the catch, so that prior to beginning a new filling operation the catch is released. As is shown in Figs. 6 and 7 the collar 11 to which the sack is secured is adapted to be locked to a frame 50 or the like which is formed with angular notches 50'. At opposite sides of the collar 11 rocking levers 51 are pivotally mounted at 51', and the said rocking levers are connected through links 52 with a hand lever 53. The levers 51 are adapted to engage studs 54 provided on the collar 11. By depressing the hand lever 53 the levers 51 are lifted so as to force the collar 11 with its seats 10 in contact with the angular notches 50' formed in the frame 50 and thereby to disengage the same from the knife edges 9, so that when striking or shaking the sack the scale beam or the knife edge bearings provided thereon can not be injured. To hold the collar in elevated position, a hook 55 is provided which carries a poise 55' tending to hold the same in position for engagement with a hook 52' formed at the upper end of the link 52. When in its elevated position the link 52 and the collar 11 are supported by the hook 55. Means are provided to release the link 52 and collar 11 from the hook 55 when the valve 20 is being opened. As shown such means consist of a cam 56 operatively connected with the valve and adapted to engage an arm 55ᵃ connected to the axis of the hook 55 and to force said arm and therewith the hook rearward against its weight 55.

I claim herein as my invention.

1. In sack scales, the combination with the scales comprising means to support the sack and to hold the same in open position, of a supply to said sack, an elastic member forming an impervious and detachable connection between said sack supporting means and supply, and means to break the connection made by said member between the sack and its supply.

2. In sack scales, the combination with the scales, and a collar on said scales adapted to have a sack secured thereto and to hold the same in open position, of a tube for supplying material to be weighed to said collar and the sack secured thereto, an elastic tube intermediate said supplying tube and collar and providing an impervious and detachable connection between the same, and means to break the connection made by said elastic tube between the collar and supplying tube.

3. In sack scales, the combination with the scales and a collar on said scales adapted to have a sack secured thereto and to hold the same in open position, of a tube for supplying material to be weighed to said collar and the sack secured thereto, an elastic tube secured with one end to said supplying tube and snugly engaging said collar with its opposite end, and means to lift said elastic tube out of engagement with said collar.

4. In sack scales, the combination with the scales, and a collar on said scales adapted to have a sack secured thereto and to hold the same in open position, of a tube for supplying material to be weighed to said collar and the sack secured thereto, an elastic tube secured with one end to said supplying tube, a ring secured to the free end of said elastic tube and adapted to fit upon said collar, and means to lift said ring out of engagement with the collar.

5. In sack scales, the combination with the scales comprising means to support the sack and to hold the same in open position, of a supply to said sack, an elastic member forming an impervious and detachable connection between said sack supporting means and supply, means to break the connection made by said member between the sack and its supply, and means to balance the weight of said elastic member.

6. In sack scales, the combination with the scales, and a collar on said scales adapted to have a sack secured thereto and to hold the same in open position, of a tube for supplying material to be weighed to said collar and the sack secured thereto, an elastic tube secured with one end to said supplying tube and snugly engaging said collar with its opposite end, means to lift said elastic tube out of engagement with said collar, and means to balance the weight of said elastic tube.

7. In sack scales, the combination with the scales and a collar on said scales adapted to have a sack secured thereto and to hold the same in open position, of a tube for supplying material to be weighed to said collar and the sack secured thereto, an elastic tube secured with one end to said supplying tube, a ring secured to the free end of said elastic tube and adapted to fit upon said collar, means to lift said ring out of engagement with the collar, and means to balance the weight of said elastic tube and collar.

8. In sack scales, the combination with the scales, and means on said scales to support a sack and to hold the same in open position, of a supply to said supporting means and sack, means to throw said supply out of operation, means to remove the sack supporting means from the scales, means to hold the sack supporting means in removed position, and means controlled when throwing the said supply into operation to throw said holding means into inoperative position.

9. In sack scales, the combination with the scales, and a collar on said scales adapted to have a sack secured thereto and to hold the same open, of a supply tube to said sack, a valve adapted to close the supply tube, means to lift said collar from the scales, means to hold the collar in lifted position, and means controlled by the valve opening operation to throw said holding means out of operation.

In testimony whereof I have hereunto set my hand in presence of two subscribing witnesses.

CARL NAGEL.

Witnesses:
WILHELM LEHRKE,
KARL MUNDT.

---

Copies of this patent may be obtained for five cents each, by addressing the "Commissioner of Patents, Washington, D. C."